United States Patent
Ellis et al.

(10) Patent No.: US 10,054,935 B2
(45) Date of Patent: Aug. 21, 2018

(54) APPARATUS AND METHOD FOR WEB-BASED TOOL MANAGEMENT

(71) Applicant: PEER INTELLECTUAL PROPERTY INC., Kitchener (CA)

(72) Inventors: Raymond W. Ellis, Austin, TX (US); Mark T. Pendleton, San Diego, CA (US); Charles M. Baylis, Cincinnati, OH (US)

(73) Assignee: PEER Intellectual Property Inc., Kitchener, Ontario (CA)

( * ) Notice: Subject to any disclaimer, the term of this patent is extended or adjusted under 35 U.S.C. 154(b) by 0 days.

(21) Appl. No.: 14/708,022

(22) Filed: May 8, 2015

(65) Prior Publication Data

US 2015/0241862 A1    Aug. 27, 2015

Related U.S. Application Data

(63) Continuation of application No. 14/091,317, filed on Nov. 26, 2013, now Pat. No. 9,841,752, which is a continuation of application No. 11/340,101, filed on Jan. 26, 2006, now Pat. No. 9,785,140, which is a continuation-in-part of application No. 09/496,009, filed on Feb. 1, 2000, now Pat. No. 8,028,049, and a continuation-in-part of application No. 09/899,833,
(Continued)

(51) Int. Cl.
| | |
|---|---|
| *G05B 19/042* | (2006.01) |
| *H04L 29/06* | (2006.01) |
| *H04L 29/08* | (2006.01) |
| *G05B 19/418* | (2006.01) |

(52) U.S. Cl.
CPC ........ *G05B 19/41855* (2013.01); *H04L 67/02* (2013.01); *H04L 67/12* (2013.01)

(58) Field of Classification Search
CPC ................ G05B 19/042; G05B 19/418; G05B 2219/45031; H04L 67/12; H04L 67/02; H04L 63/083; H04L 69/18
See application file for complete search history.

(56) References Cited

U.S. PATENT DOCUMENTS 6,112,246 A * 8/2000 Horbal .............. G06F 17/30876
707/E17.112
6,308,212 B1 10/2001 Besaw et al.
(Continued)

*Primary Examiner* — Charles Kasenge
(74) *Attorney, Agent, or Firm* — Martine Penilla Group, LLP

(57) ABSTRACT

A method is provided, including: establishing a session over the Internet with a client device, the session configured to provide for remote control or monitoring of a manufacturing tool over the Internet via communication with a controller of the manufacturing tool, the manufacturing tool being one of a plurality of manufacturing tools in a fabrication facility (FAB); receiving a request from the client device to access an equipment model defining a representation of the manufacturing tool, the representation of the manufacturing tool; receiving data from a controller of the manufacturing tool that is stored in association with a service object of the manufacturing tool; sending to the client device, via the session, a response to the request, the response including the data received from the manufacturing tool that is stored in association with the service object.

25 Claims, 14 Drawing Sheets

Related U.S. Application Data filed on Jul. 5, 2001, now Pat. No. 7,403,984, and a continuation-in-part of application No. 11/107,508, filed on Apr. 15, 2005, now Pat. No. 7,873,428.

(60) Provisional application No. 60/649,207, filed on Feb. 2, 2005, provisional application No. 60/649,754, filed on Feb. 2, 2005, provisional application No. 60/649,755, filed on Feb. 2, 2005, provisional application No. 60/649,756, filed on Feb. 2, 2005, provisional application No. 60/649,757, filed on Feb. 2, 2005, provisional application No. 60/649,758, filed on Feb. 2, 2005, provisional application No. 60/649,759, filed on Feb. 2, 2005, provisional application No. 60/649,763, filed on Feb. 2, 2005, provisional application No. 60/649,764, filed on Feb. 2, 2005, provisional application No. 60/649,765, filed on Feb. 2, 2005, provisional application No. 60/649,768, filed on Feb. 2, 2005, provisional application No. 60/649,898, filed on Feb. 2, 2005, provisional application No. 60/650,441, filed on Feb. 2, 2005.

(56) References Cited

U.S. PATENT DOCUMENTS

| | | | |
|---|---|---|---|
| 6,385,497 B1 * | 5/2002 | Ogushi | G05B 19/052 700/266 |
| 6,463,352 B1 | 10/2002 | Tadokoro et al. | |
| 6,470,227 B1 | 10/2002 | Rangachari et al. | |
| 6,810,294 B2 * | 10/2004 | Rangachari | G05B 19/4188 700/95 |
| 6,838,686 B2 * | 1/2005 | Kataoka | G03F 9/7003 250/492.22 |
| 6,892,109 B2 * | 5/2005 | Ogushi | G03F 7/70525 700/110 |
| 6,944,584 B1 | 9/2005 | Tenney et al. | |
| 6,976,033 B2 * | 12/2005 | Yang | G06Q 10/06 |
| 7,079,984 B2 * | 7/2006 | Eryurek | G05B 23/0289 700/1 |
| 7,085,827 B2 * | 8/2006 | Ishizaki | G06Q 10/06 707/999.01 |
| 7,330,768 B2 * | 2/2008 | Scott | G05B 23/0213 700/21 |
| 7,373,501 B2 * | 5/2008 | Arima | G05B 9/02 380/259 |
| 7,389,204 B2 * | 6/2008 | Eryurek | G05B 23/0272 340/506 |
| 7,395,126 B2 * | 7/2008 | Decker | G08C 17/00 700/17 |
| 7,404,207 B2 * | 7/2008 | Perry | G05B 19/4183 726/15 |
| 7,451,004 B2 * | 11/2008 | Thiele | G05B 13/048 700/28 |
| 7,493,310 B2 * | 2/2009 | Eryurek | G05B 19/418 |
| 7,698,149 B2 * | 4/2010 | Nishikawa | G06Q 10/10 705/1.1 |
| 8,028,049 B1 * | 9/2011 | Ellis | G05B 19/41865 700/108 |
| 8,121,716 B2 * | 2/2012 | Offenmuller | G06Q 10/06 700/108 |
| 8,527,314 B2 * | 9/2013 | Nishikawa | G06Q 10/06 705/7.13 |
| 2002/0029086 A1 * | 3/2002 | Ogushi | G03F 7/70525 700/65 |
| 2002/0097205 A1 * | 7/2002 | Nakamura | G03F 7/70016 345/82 |
| 2003/0004601 A1 | 1/2003 | Baek et al. | |
| 2003/0055933 A1 * | 3/2003 | Ishizaki | G06Q 10/06 709/223 |
| 2003/0123943 A1 * | 7/2003 | Hamada | A61C 13/0004 409/96 |
| 2003/0176940 A1 * | 9/2003 | Rangachari | G05B 19/4188 700/121 |
| 2003/0195646 A1 * | 10/2003 | Yang | G06Q 10/06 700/96 |
| 2003/0226010 A1 * | 12/2003 | Arima | G05B 9/02 713/150 |
| 2003/0229805 A1 * | 12/2003 | Perry | G05B 19/4183 726/15 |
| 2004/0002841 A1 * | 1/2004 | Mayuzumi | G06T 19/00 703/7 |
| 2004/0071161 A1 * | 4/2004 | Tahara | G03F 7/70533 370/465 |
| 2004/0111499 A1 * | 6/2004 | Dobrowski | H04L 29/06 709/222 |
| 2004/0148513 A1 * | 7/2004 | Scott | G05B 19/042 726/26 |
| 2004/0174510 A1 * | 9/2004 | Kataoka | G03F 9/7003 355/53 |
| 2004/0204775 A1 * | 10/2004 | Keyes | G05B 13/042 700/29 |
| 2004/0230328 A1 * | 11/2004 | Armstrong | G05B 19/418 700/83 |
| 2004/0260408 A1 * | 12/2004 | Scott | G05B 23/0213 700/20 |
| 2004/0260597 A1 * | 12/2004 | Nishikawa | G06Q 10/06 705/7.13 |
| 2005/0027794 A1 * | 2/2005 | Decker | G08C 17/00 709/201 |
| 2005/0044204 A1 * | 2/2005 | Nishikawa | G06Q 10/10 709/223 |
| 2005/0197803 A1 * | 9/2005 | Eryurek | G05B 23/0289 702/185 |
| 2005/0197805 A1 * | 9/2005 | Eryurek | G05B 23/0272 702/188 |
| 2005/0197806 A1 * | 9/2005 | Eryurek | G05B 23/0221 702/188 |
| 2006/0007418 A1 * | 1/2006 | Hamatani | G03F 7/706 355/52 |
| 2006/0052891 A1 * | 3/2006 | Ikeda | G06T 17/00 700/97 |
| 2006/0095545 A1 | 5/2006 | Dreyer et al. | |
| 2006/0285100 A1 * | 12/2006 | Hamatani | G03F 7/70258 355/55 |
| 2007/0078529 A1 * | 4/2007 | Thiele | G05B 13/048 700/29 |

* cited by examiner

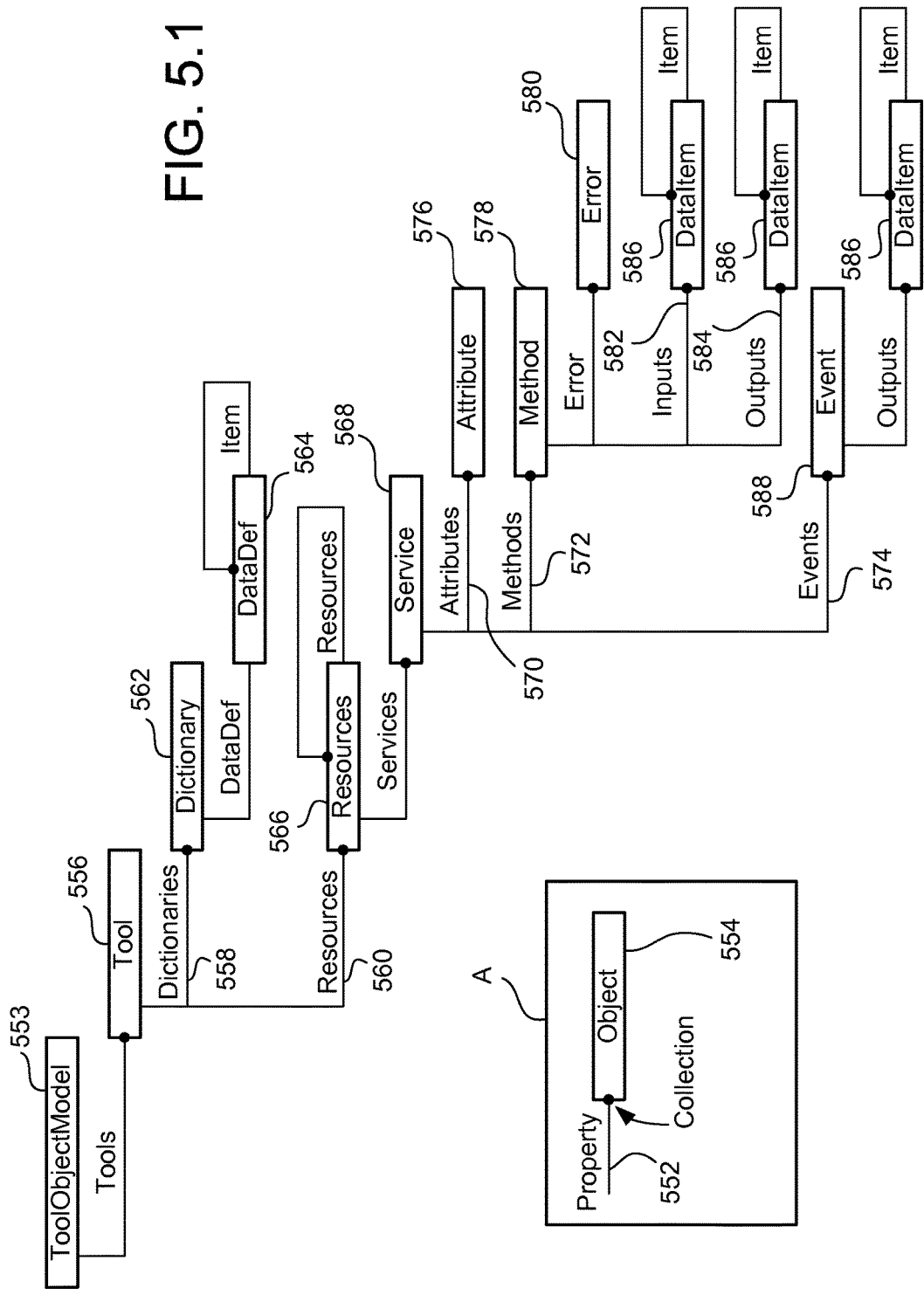
FIG. 5.1

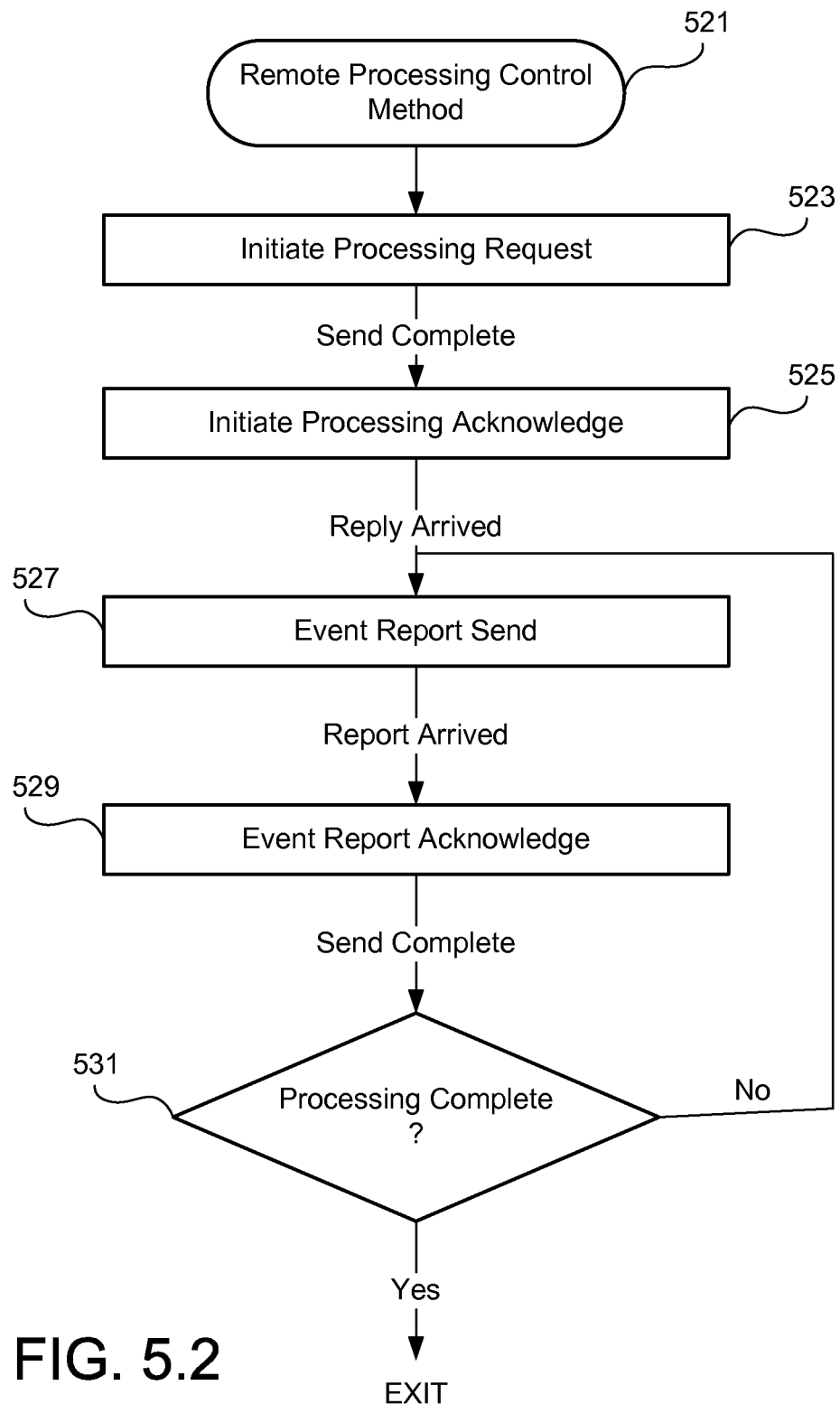
FIG. 5.2

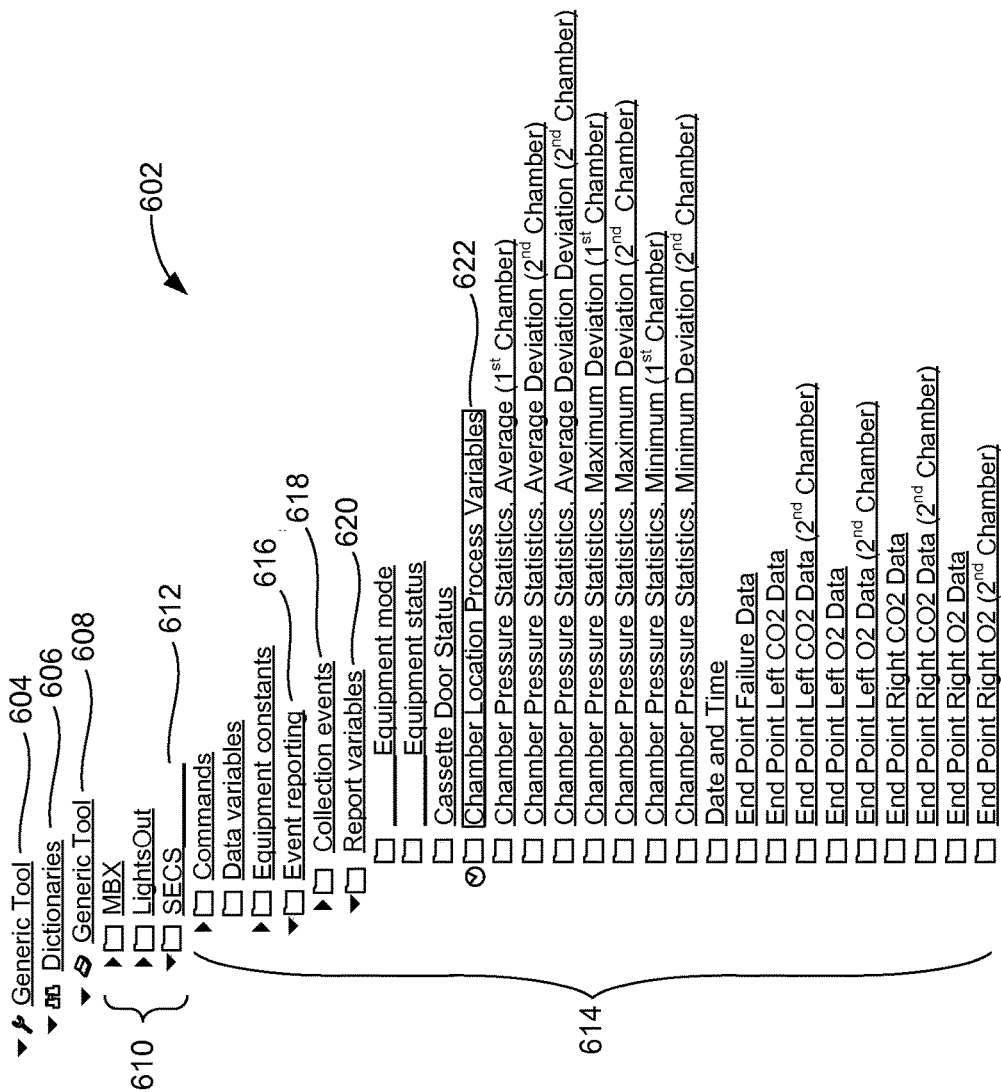
FIG. 6.1

| | |
|---|---|
| Alias("intrinsic") | |
| AccessID | Chamber Location Process Variables |
| AllowDuplicates | 49 |
| CanAddName | False |
| Comments | False |
| | 0 = Back Chamber Installed;1 = Right Chamber installed;2 = Right and Back Chambers initiated |
| Count | 0 |
| DefaultValue | (Null) |
| Description | |
| Dictionary.Name | Generic Tool |
| Format | 26 (tomFormatI2) |
| Key | 157 |
| LinkChildren | False |
| Maximum | (Null) |
| Minimum | (Null) |
| Name | Chamber Location Process Variables |
| OrderChildrenByAcessID | False |
| Parent.Name | Report Variables |
| SimulatedValue | (Null) |
| Units | |
| ValueRequired | False |

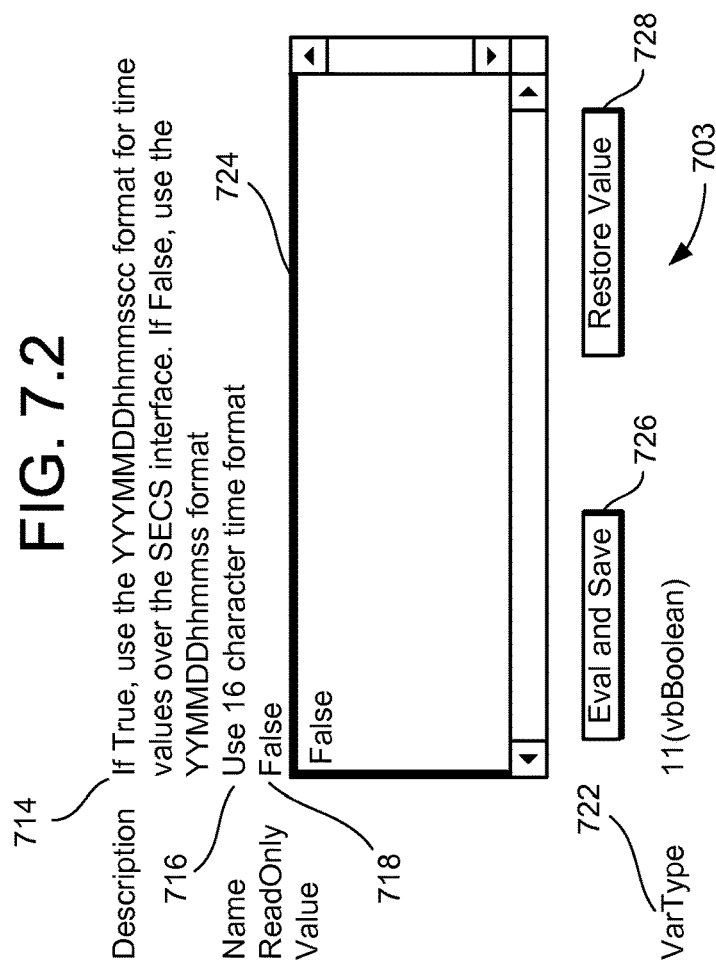
FIG. 7.2
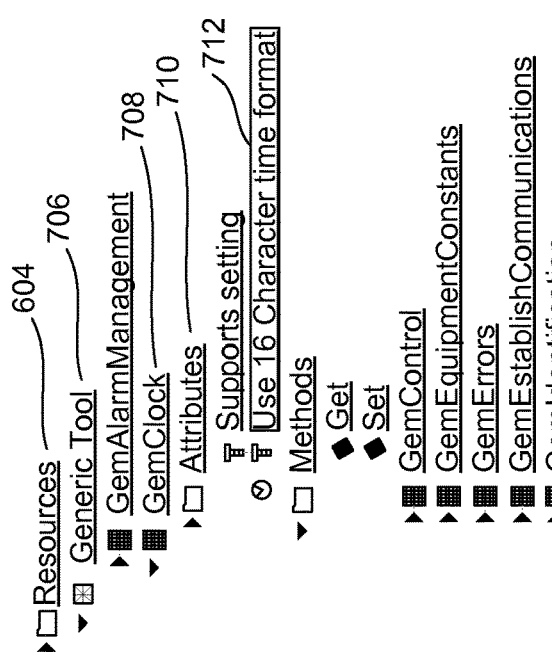
FIG. 7.1

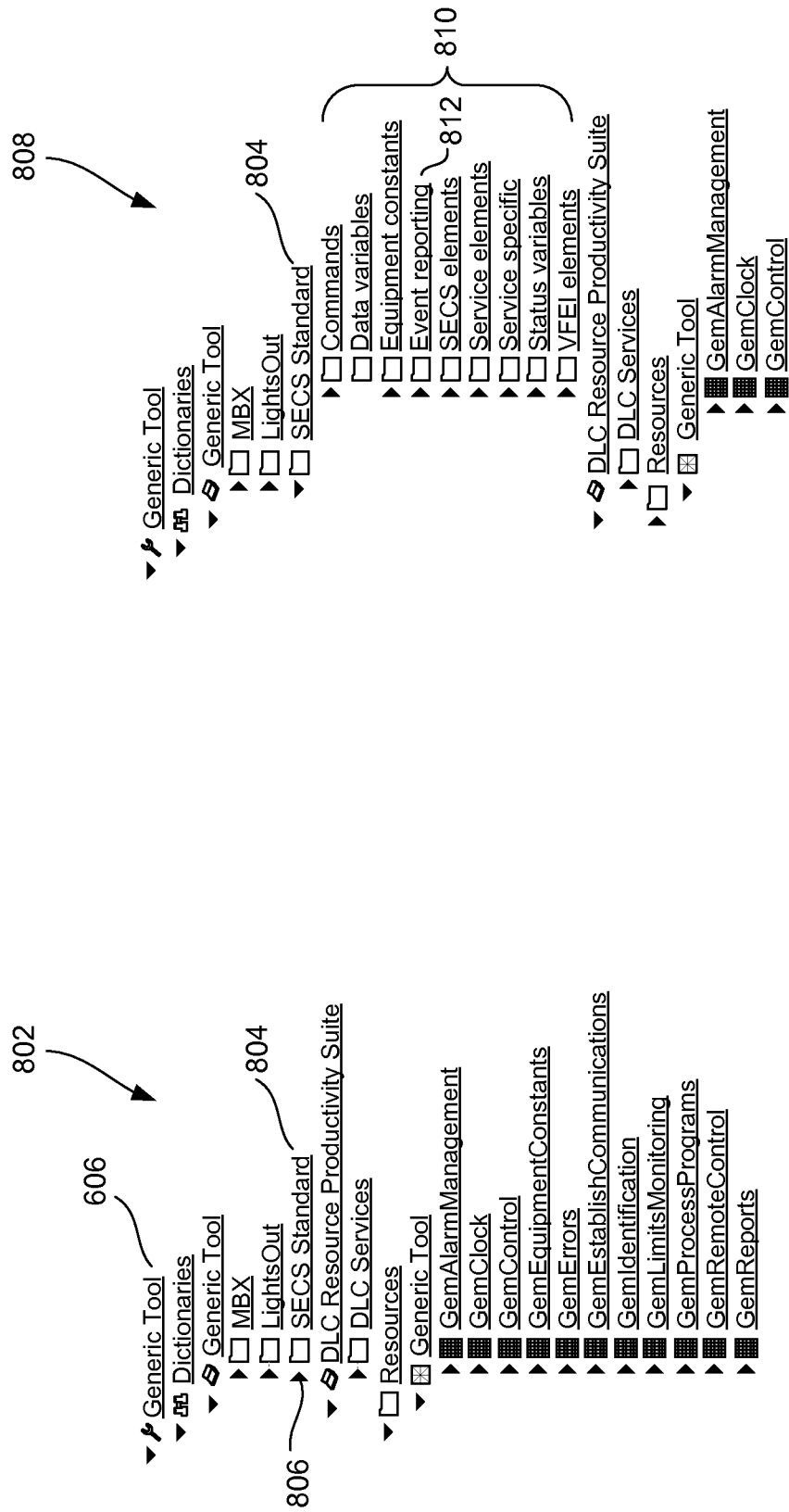

FIG. 9.2
FIG. 9.1

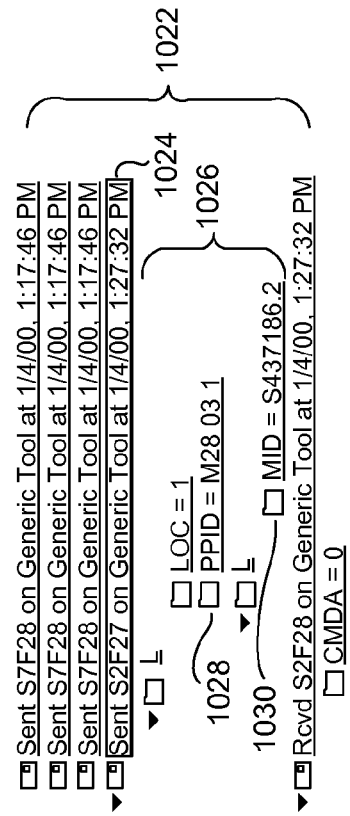
| | |
|---|---|
| Description | Initiate Processing Request |
| ResourceItem.Count | 1 |
| ResourceName | Generic Tool |
| Length | 28 |
| MessageType | SECS |
| Name | S2F27 |
| Raw | 01 03 21 01 01 01 41 08 4D 32 38<br>5F 30 33 5F 31 01 01 41 09 53<br>34 33 37 31 38 36 2E 32 |
| ReplyExpected | True |
| Sent | True |
| TransactionID | 25 |
FIG. 10.2
FIG. 10.1

APPARATUS AND METHOD FOR WEB-BASED TOOL MANAGEMENT

CROSS REFERENCE TO RELATED APPLICATIONS

The present application is a continuation of U.S. application Ser. No. 14/091,317, filed Nov. 26, 2013, which is a continuation of U.S. application Ser. No. 11/340,101, filed Jan. 26, 2006, which is a continuation-in-part of U.S. application Ser. No. 09/496,009, filed Feb. 1, 2000, and a continuation-in-part of U.S. application Ser. No. 09/899,833, filed Jul. 5, 2001, and a continuation-in-part of U.S. application Ser. No. 11/107,508, filed Apr. 15, 2005, and claims priority to each of the following thirteen U.S. Provisional Application Ser. Nos. filed on Feb. 2, 2005: 60/649,207, 60/649,754, 60/649,755, 60/649,756, 60/649,757, 60/649,758, 60/649,759, 60/649,763, 60/649,764, 60/649,765, 60/649,768, 60/649,898, 60/650,441, all of the above applications herein incorporated by reference.

TECHNICAL FIELD

The present invention relates in general to data processing systems, and in particular, to data processing systems for managing manufacturing equipment via the web.

BACKGROUND INFORMATION

Modern manufacturing facilities rely on highly automated tools to implement the manufacturing process. For example, semiconductor fabrication ("fab") facilities incorporate highly automated tool sets for the processing of semiconductor wafers. Process control and monitoring is mediated through a set of software methods which may be invoked to implement the processes and monitoring to be performed. The control and monitoring software run on a tool server which may be coupled to the tools via a plurality of ports, each of which interfaces the tool server with a particular tool, in point-to-point fashion. Alternatively, the tools in the tool server may reside on a Local Area Network (LAN). To control the manufacturing process, a user must be able to communicate with the tool server, either via a user system resident on the LAN, or otherwise in communication with the tool server. In particular, remote access to the tool server for control and monitoring of the status of a tool, to the extent that it exists at all, requires the development of specialized code implemented on each platform for which remote access is to be provided. Thus, there is a need in the art for methods and apparatus for providing remote tool management capabilities. In particular, there is a need in the art for apparatus and methods for providing remote tool management without the necessity for developing specialized, platform dependent software.

SUMMARY OF THE INVENTION

The aforementioned needs are addressed by the present invention. Accordingly, there is provided, in a first form, a method of tool management. The method includes receiving a request over a network. A request type is determined from a predetermined portion of the request. In response to the request and the type of the request, a message is sent to the tool, which message is operable for controlling an operation of the tool.

There is also provided, in a second form, a data processing system. The system includes circuitry operable for receiving a request via a network. The system also includes circuitry operable for determining a type of the request using a predetermined field in a portion of the request, and circuitry operable for sending a message to a tool in response to the first request and the type of the request. The message is operable for controlling an action of the tool.

Additionally, there is provided, in a third form, a program product embodied in a tangible storage medium. The program contains programming for tool management and includes instructions for receiving a request over a network. A request type is determined from a predetermined portion of the request. Also included are instructions for sending a message to the tool in response to the request and the type of the request, which message is operable for controlling an operation of the tool.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5.1 illustrates a graphical user interface (GUI) representation of a tool object model which may be used in the HTTP request process of FIG. 5;

FIG. 5.2 illustrates, in flow chart form, an exemplary process control methodology which may be used with the present invention;

FIGS. 6.1 and 6.2 illustrate displays associated with an information request in accordance with the principles of the present invention;

FIGS. 7.1 and 7.2 illustrate displays associated with an edit request in accordance with the principles of the present invention;

FIGS. 8.1 and 8.2 illustrate displays associated with an expand request in accordance with the principles of the present invention;

FIGS. 9.1 and 9.2 illustrate displays associated with an execute request in accordance with the principles of the present invention;

FIGS. 10.1 and 10.2 illustrate displays associated with an information request for a method history in accordance with the principles of the present invention.

DETAILED DESCRIPTION

Figure 1:
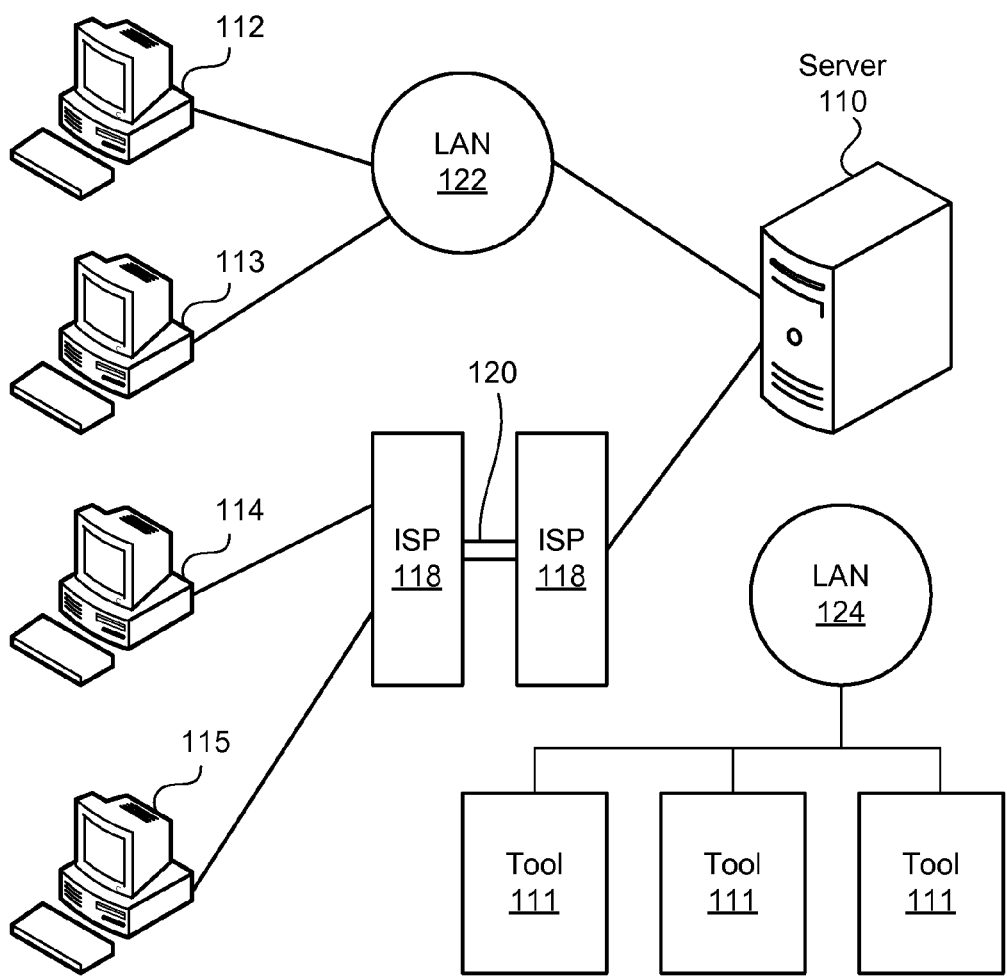
FIG. 1 illustrates, in block diagram form, a data processing network in accordance with an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a mechanism for managing automated manufacturing tools and processes via an Internet worked data processing system. Remote interactions between a client and a processing tool are provided using standard Internet protocols and facilities. These may include the hypertext transfer protocol (HTTP), the hypertext markup language (HTML), and Extensible Markup Language (XML). The present invention enables users to interact with an automated tool using a standard web browser running on a client data processing system. The user may, for example, query and change the status and configuration of the automated tool, and command it to perform activities, such as in a semi-conductor fabrication environment, for example, to begin processing material. The present invention also allows users to interact with a station controller interfaced to the tool, querying and changing the configuration and status of the station controller, and instructing the controller to perform various activities, for example, performing a logging or reporting function. Additionally, the methods and apparatus of the present invention include web server functionality, obviating the need to configure and administer a separate web server.

Refer now to the drawings, wherein depicted elements are not necessarily shown to scale and wherein like or similar elements are designated by the same reference numeral through the several views.

FIG. 1 illustrates a representative network environment which may be used with the present invention. A plurality of clients 112-115 facilitate user interactions with a plurality of automated manufacturing tools 111. Within clients 112-115, the tool management facilities are provided via a standard web browser. Such web browsers are known in the data processing art, and include, for example, Netscape Navigator®, a product of Netscape Communications Corporation, and Internet Explorer, a product of Microsoft Corporation. Interactions between users, one of clients 112-115 and tools 111 are mediated via server 110 which implements the methodologies of the present invention, further described below in conjunction with FIGS. 3-6.

Clients 112-115 are networked with server 110. Clients 112 and 113 are networked via LAN 122. Clients 114 and 115 are networked via the Internet. Clients 114 and 115 communicate via a facility having a presence on the Internet, here generically referred to as an Internet Service Provider (ISP) 118. Additionally, server 110 interfaces with the Internet via an ISP 118. Note that clients need not rely on a wired connection but may be a wireless device. Wireless clients could, for example, include a conventional personal computer and wireless modem or even a web capable cellular telephone. Each ISP 118 is coupled to Internet backbone 120. Alternatively, a manufacturing facility may itself have a presence on the Internet, and in such an alternative embodiment of the networking environment in FIG. 1, server 110 may incorporate hardware for connecting to Internet backbone 112. Information may be exchanged between clients 112-115 and server 112 using the hypertext transfer protocol (HTTP). Additionally, the data constituting the information for managing tools 111 to be exchanged between clients 112-115 and server 110 may be communicated using the transmission control protocol TCP/Internet Protocol (TCP/IP). TCP/IP is a standard communication protocol on the Internet.

Additionally, server 110 is networked with tools 111 and provides tool management information thereto in response to the user input received via clients 112-115. In the exemplary embodiment of FIG. 1, server 110 is connected to tools 111 via LAN 124. Alternatively, tools 111 may reside on LAN 122. However, in such an alternative embodiment, tool management operations by users on clients 112 and 113 would still be mediated via server 110 through the standard web browser on clients 112 and 113.

Figure 2:
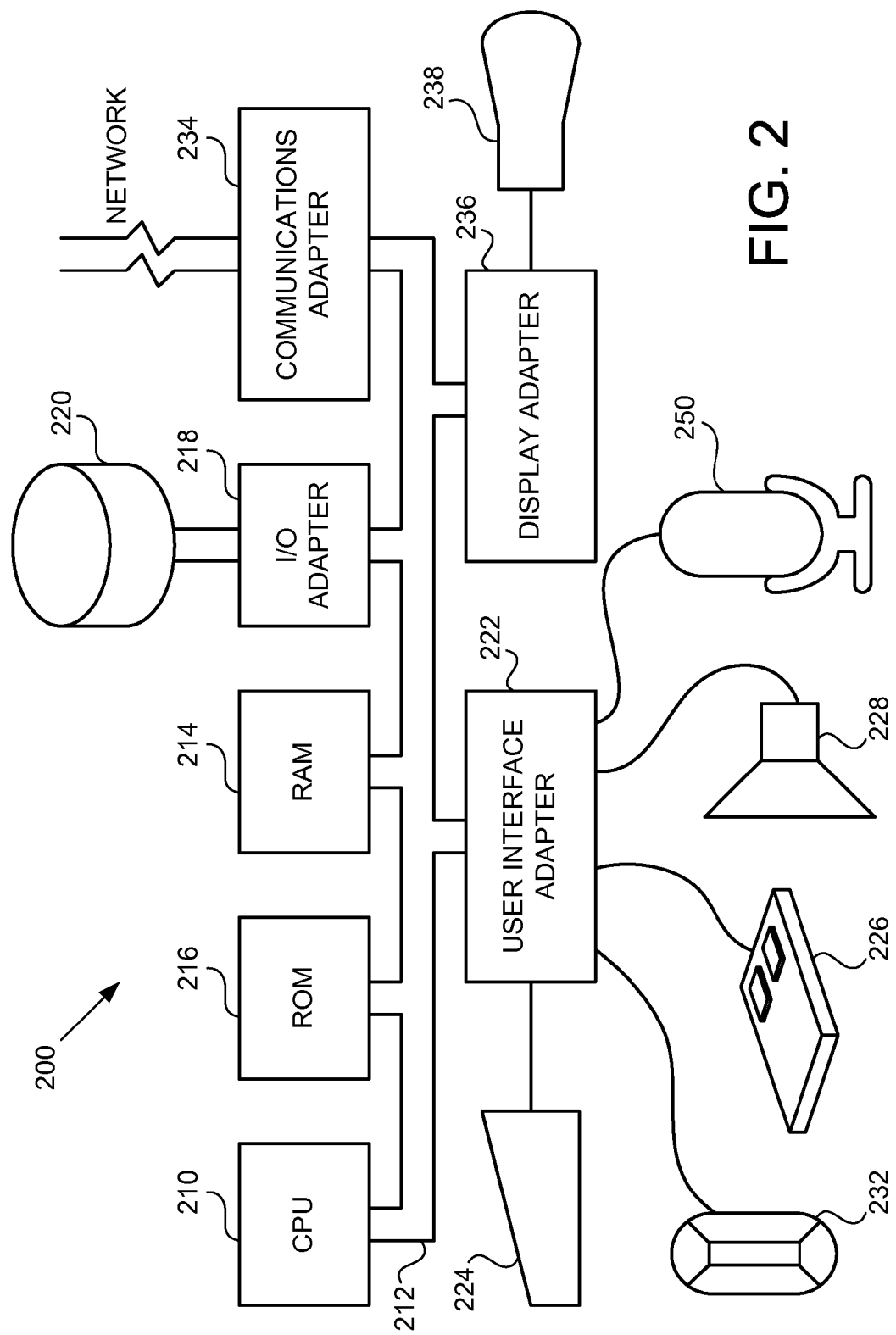
FIG. 2 illustrates, in block diagram form, a data processing system which may be used in a client and a server of FIG. 1.

FIG. 2 illustrates a block diagram of a representative data processing system 200. Data processing system 200 may be used to implement clients 112-115. Additionally, data processing system 200 may be used in an implementation of server 110 by incorporating software which performs the methodologies of the present invention as described further below. The system has a central processing unit (CPU) 210, which is coupled to various other components by system bus 212. Read-only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system through-out the keyboard 224, trackball 232 or mouse 226 and receiving output from the system via speaker 228 and display 238.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
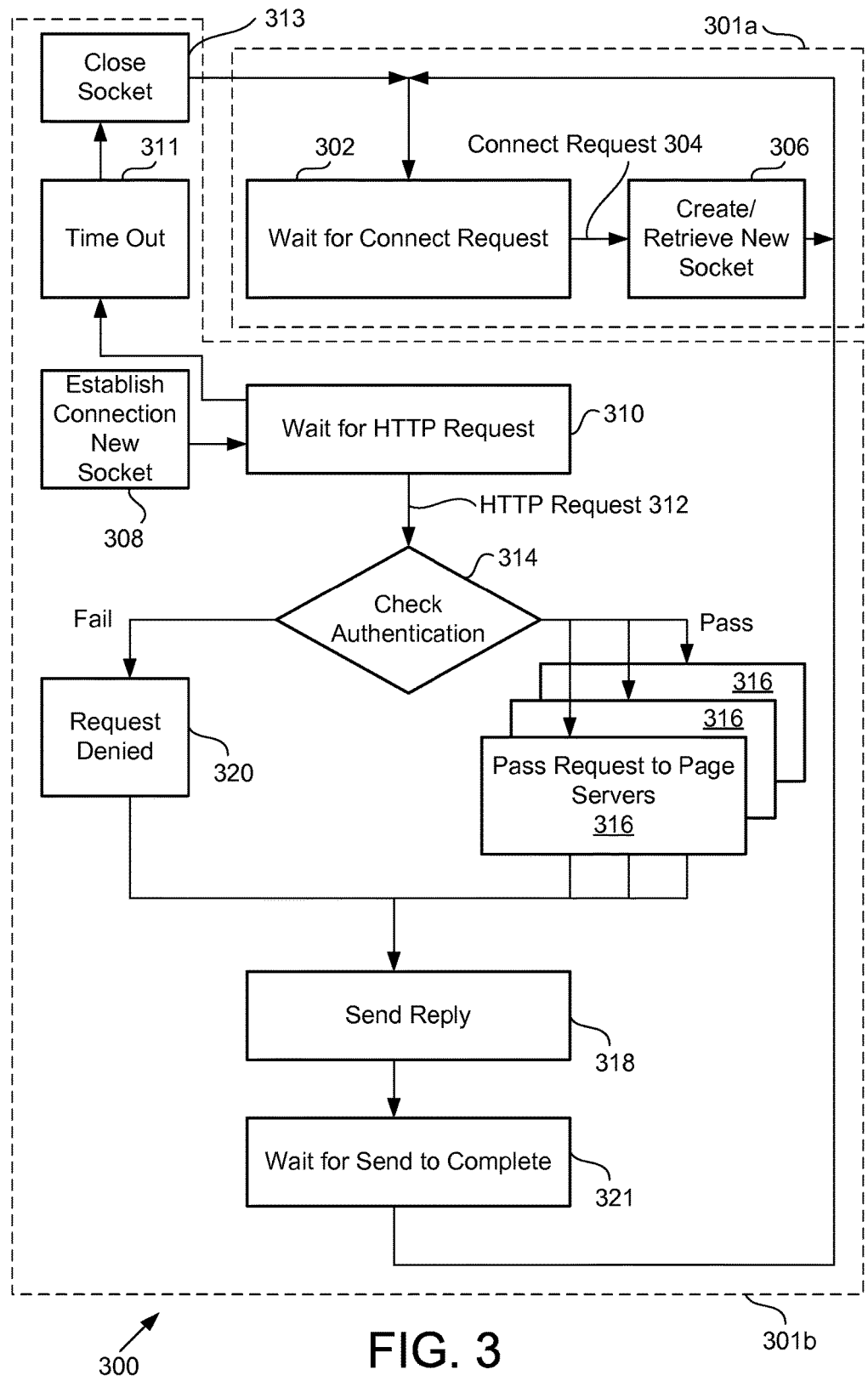
FIG. 3 illustrates, in flow chart form, a hypertext transfer protocol (HTTP) server methodology in accordance with an embodiment of the present invention.

Refer now to FIG. 3 illustrating an HTTP server methodology 300 in accordance with the principles of the present invention. Methodology 300 may be incorporated, for example on server 110 in FIG. 1. In step 302, HTTP server methodology 300 waits for a connection request on a TCP/IP socket. This is the idle state for HTTP server methodology 300. An artisan of ordinary skill in the art would understand a socket to be a virtual port that enables clients, such as clients 112-115, FIG. 1, to connect to a server, such as server 110. In an embodiment of the present invention, the Internet Protocol (IP) address and port number for the socket are configurable. A client communicates information to server methodology 300 by specifying the preselected values of the IP address and the port number. On receipt of a connection request 304, a new socket is generated, step 306. Alternatively, a pool of sockets may be created, and a socket retrieved from the available pool. In step 308, a connection is established on the new socket created, or alternatively, retrieved, in step 306. In step 310, subprocess 301*b* waits for an HTTP request. Additionally, a timer is running whenever methodology 300 is waiting for an HTTP request. If the timer expires, step 311, the correction is deemed to have been broken, and the socket opened in step 308, is closed, step 313.

Upon arrival of an HTTP request, 312, it is then determined if the request is from an authorized user, step 314. A security server process for performing step 314 will be described in detail in conjunction with FIG. 4.

If, in step 314, the user is valid, HTTP requests 312 is passed to a page server, step 316. The process by which a page server handles the HTTP request will be described in detail in conjunction with FIG. 5. Note that a plurality of page servers may be running concurrently, for example, as multiple threads within methodology 300. In this way, methodology 300 may handle multiple requests. The appropriate page server may be determined in an embodiment of the present invention by the data passed in a Uniform Resource Locator (URL). URLs are a string representation of a resource available via the Internet. The syntax and semantics for URLs are defined in accordance with an Internet protocol standard in Request for Comments (RFC) 1738, which is hereby incorporated herein by reference. A portion of the URL is referred to as the "url-path". The url-path supplies the details of how a resource can be accessed. The syntax of the url-path is a sequence of alphanumeric strings separated by the "/" ("forward slash").

In an embodiment of the present invention, the url-path of HTTP request 312 is used to determine the page server that will be invoked upon receiving the request, and specify the functions being requested and the object upon which the functions will be performed. A url-path, in accordance with the principles of the present invention may have the form: /$dir_0$/$dir_1$/$dir_2$ . . . .

The "$dir_i$" values serve a similar function as directories do in a computer's local file system. The first directory, "$dir_0$", is used to determine which page server will be invoked in step 316 to service the HTTP request. In other words, the particular value of "$dir_0$" received in HTTP request 312 specifies the particular page server that will service the request. Page servers register themselves with methodology 300 during initialization. Initialization typically occurs when the program starts, usually a result of a static configuration read from a file or database. However, initialization may also occur, for example, in response to adding a new module to the equipment wherein the corresponding page server is configured and initialized dynamically. On registering, the page server provides the name of the directory the particular page server will "serve". Additionally, a brief description is also provided that is used to generate a "home page" for the tool corresponding to the particular page server. The "home page" allows users to access the tool management facilities using a conventional web browser. This will be discussed further in conjunction with FIG. 5 hereinbelow.

The page server invoked in step 316 generates a reply to HTTP request 312. This will also be discussed further in conjunction with FIG. 5. The reply is passed to methodology 300 which sends the reply in step 318. The reply may take a finite amount of time to send due to delays arising from available network resources, or transmission errors, for example. In step 321 methodology 300 waits for the send to complete. On completion, methodology 300 closes the socket opened/retrieved in step 306 and notifies client that send is complete.

Figure 4:
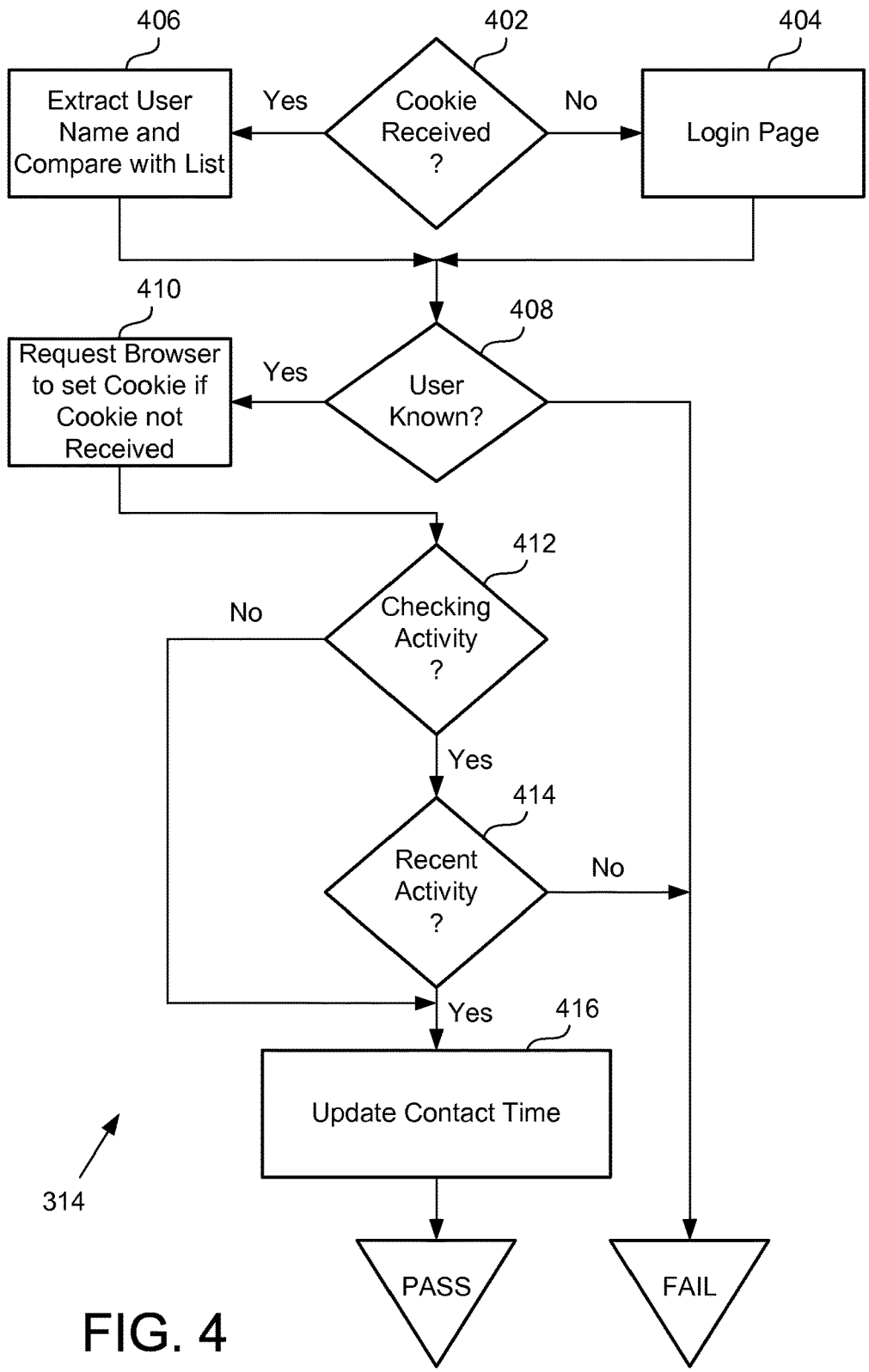
FIG. 4 illustrates, in flow chart form, a security server methodology which may be used with the HTTP server process of FIG. 3.

Refer now to FIG. 4 illustrating a security server process which may be used to implement step 314 in methodology 300. In step 402 it is determined if a cookie is received in the header of the HTTP request. If not, a login page is presented in step 404. If, however, a cookie is received in the HTTP header, in step 406 the user name is extracted and compared with a list maintained by the server.

In step 408 is determined if the user is known. If a cookie has been received, and the user name extracted in step 406 compares with one of the names in the list, or if the user name and password received via the login page presented in step 404 compare with an entry in the list maintained by the server, then step 408 proceeds by the yes branch to step 410. In step 410, if a cookie was not received in step 402, that is the user logon via the login page presented in step 404, the user's browser is requested to set a cookie of the same name as the tool in the HTTP request, in which the cookie contains the user's name. Subsequent HTTP request will then contain the cookie in the header, and in servicing that request, methodology 300, FIG. 3, via step 314 would proceed by the yes branch in the corresponding step 402. If, in step 408 the user was not recognized, then access fails, and in step 320, FIG. 3, a request denied message is generated, and sent in step 318.

In step 412 it is determined if a check activity option is active. The check activity option automatically logs out a user that has been inactive for a preselected interval of time. If, in step 412, activity checking is enabled, then, in step 414 it is determined if the user has had recent activity. That is, if the user has been active prior to the expiration of the preselected time interval for automatically logging out users. If the user has not been recently active, then access fails, and, in step 320, FIG. 3, a request denied message is generated, and sent to the user in step 318, FIG. 3.

If, however, in step 414 the user has generated activity within the preselected time interval, the contact time maintained in the server database is updated, step 416 and the current HTTP request is passed to the page servers, step 316, FIG. 3. Furthermore, if, in step 412, activity checking is disabled, step 414 is bypassed, and methodology 300 implementing authentication checking in accordance with the embodiment of step 314 in FIG. 4 proceeds directly to step 416 to update the contact time in the server database entry corresponding to the current user.

Figure 5:
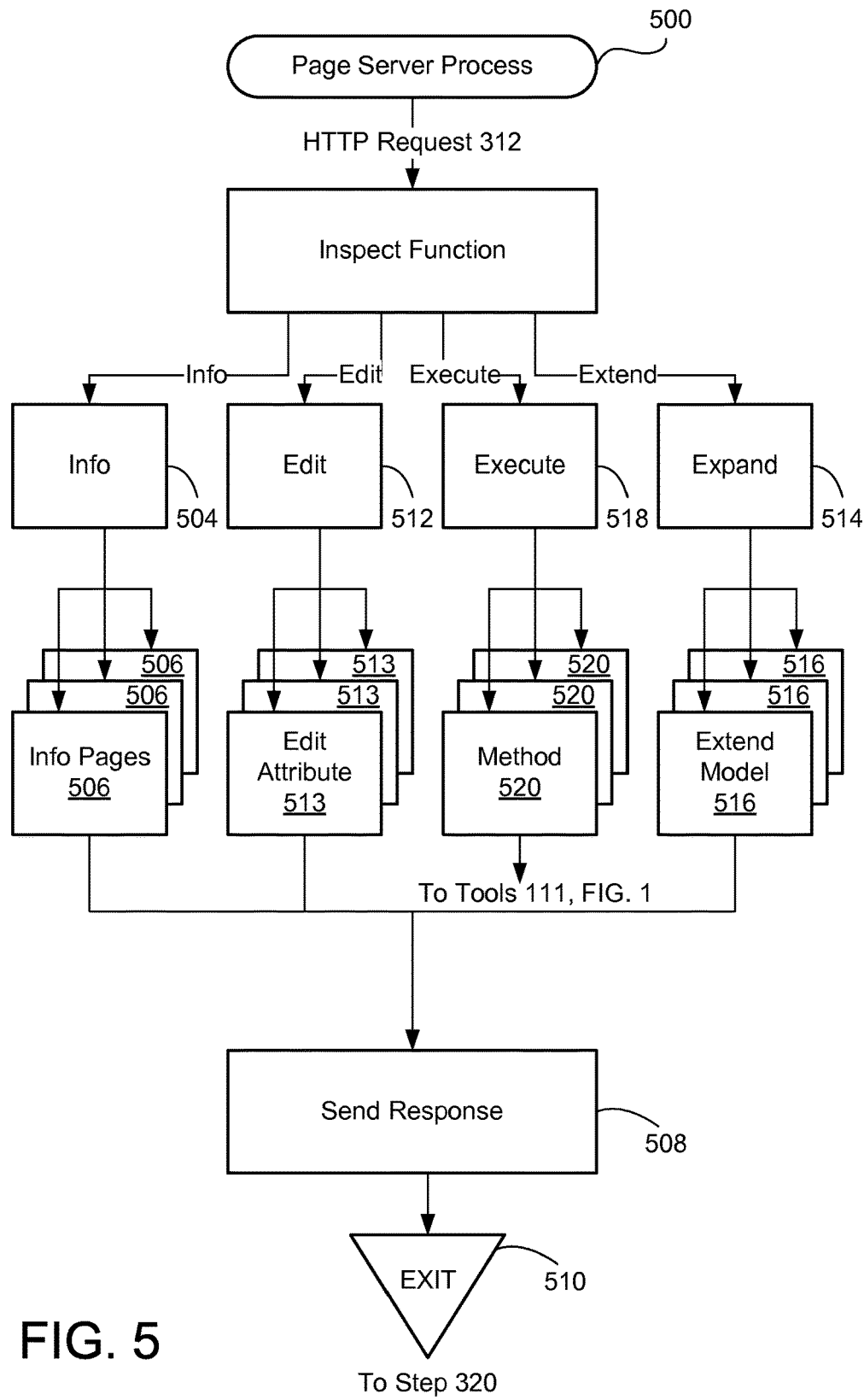
FIG. 5 illustrates, in flow chart form, a process for generating responses to HTTP requests received in accordance with the HTTP methodology of FIG. 3.

Refer now to FIG. 5 illustrating a page server methodology 500 in accordance with the embodiment of the present invention. Page server methodology 500 may receive an HTTP request from step 316 of methodology 300, FIG. 3.

In step 502 the HTTP request is inspected to determine the function to be performed. Because it is difficult to maintain accurate information about a client browser's session with an HTTP server, the functions that page server process 500 perform may only depend on the information passed in the HTTP request. The fields available in the HTTP request to store this information are, principally, are the URL, and the search (or query) field. In an embodiment of the present invention in accordance with page server process 500, FIG. 5, the URL is used to describe the functions the page server is to perform.

As previously described in conjunction with FIG. 3, the url-path in the url field in an HTTP request has the approximate form /$dir_0$/$dir_1$/$dir_2$/ . . . . The field labeled "$dir_0$" has a predetermined name which, appearing in a url-path informs the HTTP server process to invoke a page server process, in accordance with, for example, step 316 in FIG. 3. In an embodiment of the present invention, the string "Explorer" may be used to invoke the page server process, however, a artisan of ordinary skill in the art would understand that another predetermined term in the "$dir_0$" field of the url-path could be used, and such alternative embodiments would be within the spirit and scope of the present invention.

The next field, "$dir_1$," may contain the "name" or similar designator of the function that is being requested. Thus, the function may be determined, in such an embodiment, in step 502 by inspecting the field "$dir_1$" in the url-path of the url in the HTTP request. Additionally, the field "$dir_2$" may contain the name or other identifier of the object upon which the function will be performed. An object identifier may simply be an assigned number which might, in an embodiment of the present invention start at one, or other predetermined value, and consecutively number the objects. Alternatively, the "fully qualified" object name (analogous to a fully qualified path name) may be used to build a hash table with the key being the hash of the object name and the value a pointer to the object, and the key serves as the object identifier. It would be understood by an artisan of ordinary skill that such alternative embodiments are within the spirit and scope of the present invention. The remaining fields in the url-path portion of the URL in the HTTP request may include additional function-specific information. These will be described further below.

Refer now to FIG. 5.1 illustrating a tool object model 550 which may be used with the present invention. Object model 550 is in accordance with a tool object promulgated by Brook Automation, Inc. However, it would be understood by an artisan of ordinary skill in the tool automation art that the principles of the present invention may be used with other tool object models in the same fashion. Tool object model 550 provides a logical description in the automatic control environment of a physical tool "on the factory floor." As indicated in Inset A, showing the generic format for describing the organization of tool object model 550, a property 552 is a collection of one or more objects 554; the "filled circle" denoting "collection." Thus, tool object model 550 includes a collection of one or more tool objects 556. Likewise, tool object 556 includes dictionaries 558 and resources 560. Dictionary 558 is a collection of dictionary objects 562 which, itself, includes a collection of data definition objects 564. A data definition object defines a data structure, and may be viewed as a type statement analogous to a "typedef" in the C programming language. Resources 560 include a collection of one or more resource objects 566. Resource object 566 includes a collection of service objects 568.

Each service object 568 includes attributes 570, methods 572 and events 574. Attributes, which are defined as a collection of attribute objects 576 that a collection of one or more attribute objects 576. Methods 572 include a plurality of method objects 578. Method objects 578 perform the functionality in the management of the physical tool. Method objects 578 include error objects 580 for error reporting, and, in the typical fashion, inputs 582 and 584, each of which is defined to be a collection of one or more data item objects 586. A data item object 586 may be an actual value of a variable or parameter. Events 574 constitute a collection of one or more event objects 588, each of which includes an output which is a collection of one or more data item objects 586. Examples of attributes, methods and events will be described hereinbelow.

The functions that the page server may perform include an information function, an editing function, an execution function, and an expanding function. (These may be denoted "INFO", "EDIT", "EXECUTE" and "EXPAND".) Each of these will be discussed below.

The INFO function provides detailed information about the current attributes of a selected object. The INFO function is invoked, step 504, in response to a corresponding first predetermined value in field "$dir_1$" representing the designator of the function being invoked. For example, the first predetermined value may be the string "Info" but other values would be used, as would be recognized by an artisan of ordinary skill. In response, INFO pages 506 containing the information about the attributes of the object (identified in field "$dir_2$" of the URL) are returned to the client browser, step 508. Page server methodology then exits, step 510 by returning to step 321 of HTTP server process 300. At step 321, HTTP server process 300 waits for the send to complete, and then returns to step 302, for the next connect request.

This may be understood by referring to FIG. 6.1 illustrating an exemplary display 602 for Generic tool tool object 604. Display 602 has been expanded to show child dependencies from root objects, as will be discussed in detail hereinbelow in conjunction with FIGS. 8.1 and 8.2. The dictionary object 606 includes Generic tool Dictionary 608. Within the Generic tool Dictionary 608, there are a plurality of data definition objects 610 including the SEMI equipment communication standard (SECS) 612. SECS 612 itself includes a plurality of data items 614. Event reporting data item 616 includes a set of collection event items 618 and a set of report variables 620.

Information about a tool object may be obtained by sending a corresponding HTTP request to HTTP server process 300, FIG. 3. HTTP server process 300 then passes the request to the page server process as previously described. Otherwise, it would be too time consuming to download all of the details of every tool object in a large tool object model to a browser, and too error-prone to try to synchronize dynamic attributes of the object model between a client and the server.

Information about an object is obtained by sending an HTTP request to HTTP server methodology 300, FIG. 3. An information HTTP request has a first predetermined value in the "$dir_1$" field of the URL-path. For example, the first predetermined value may be the string "Info". However, it would be understood by an artisan of ordinary skill that other predetermined values may be used in accordance with the principles of the present invention, and such alternative embodiments would be within the spirit and scope of the present invention. HTTP server methodology 300 passes the request to page server process 500, as previously described hereinabove. Referring again to FIG. 5, inspect function step 502 uses the value in the "$dir_1$" field of the URL-path of HTTP request 312, corresponding to the information request, to pass the request to information step 504. Step 504 uses the value in the "$dir_2$", the object ID to generate the corresponding information page 506 and send the page to the client in step 508. An information HTTP request may be initiated by selecting the object for which the detailed information is sought by selecting the object on the web browser display. Thus, in exemplary display 602, chamber location process variables item 622, shown highlighted in FIG. 6.1, has been selected. An object may be selected by "clicking" on the object on the display with a user input device, such as mouse 226, FIG. 2.

In response to the information HTTP request, as previously described, page server process 500 generates the corresponding web page containing the detailed information for the selected object. FIG. 6.2 illustrates exemplary information display 624 corresponding to chamber location process variables item 622, FIG. 6.1. Exemplary information display 624 is with reference to the SECS, however, an ordinarily skilled artisan would understand that the principle of the present invention do not rely on the SECS, and tool objects implemented in accordance with another set of protocols may return different information. Nevertheless, the principles of page server process 500 would operate in the same fashion, and such alternative embodiments would be within the spirit and scope of the present invention.

Refer now to FIGS. 7.1 and 7.2 illustrating an exemplary display which may be shown on a client GUI in association with an edit attribute page 573, FIG. 5, generated by page server process 500. Display 702 shows a tool management resource directory 704 including tool object 706. Tool object 706 provides a plurality of services that may be accessed using the principles of the present invention. Attributes of the services provided by the tool via the tool object model are also shown in display 702. Attributes 710 of GEM clock 708 are displayed, and include a time formatting attribute 712, shown highlighted in FIG. 7.1. ("GEM" denotes the Generic Model for Communications and Control of SEMI Equipment standards promulgated by Semiconductor Equipment and Materials International (SEMI). SEMI is a global trade association that represents the semiconductor and flat panel which promulgates standards for ensuring compatibility equipment automation standards, such as GEM. Exemplary embodiments will be described in the context of automated fabrication ("fab") facilities in the semiconductor industry. Nevertheless, it would be understood by an ordinary skilled artisan that the principles of the present invention may be used in the same fashion with other automated manufacturing processes.) Attributes of objects may be modified using the principles of the present invention. An attribute may be modified by the client sending an EDIT request in an HTTP request 312, FIG. 3. As previously described, page server process 500 inspects HTTP request 312 in step 502. If the HTTP request includes an edit request, determined in step 502 by inspecting the "$dir_1$" field, for a second predetermined value, then in step 512, an edit method is invoked and an edit attribute page 512, is sent, step 508. The second predetermined value may be the string "Edit," however, an artisan of ordinary skill would understand that other values may be used. Additionally, the "$dir_2$" field may include the name of the variable being edited.

FIG. 7.2 illustrates a graphical display 703 of an edit response in accordance with the principles of the present invention. Display 703 corresponds to the exemplary sixteen character time format attribute 712 of FIG. 7.1. Description field 714 describes the particular attribute. Name field 716 displays the name of the attribute, which reflects the attribute name appearing in the corresponding display 702. Read-Only field 718 displays the value of a Boolean "Read-Only" value. If the value displayed in Read-Only field 718, then the value of the attribute may not be changed by the user, conversely, if the value displayed in Read-Only field 718 is "False", then the value of the attribute itself may be modified by the user as in the exemplary attribute in FIGS. 7.1 and 7.2. Value field 720 displays the value of the attribute itself. In FIG. 7.2, the value of the attribute, "False" is contained in an editable form 724. The user may, in the exemplary attribute of FIGS. 7.1 and 7.2, change the value of the attribute, and thereby change the format for time values. VarType field 722 displays the attribute type, in the exemplary illustration of FIG. 7.2, a Visual Basic Boolean value. The user may change the value of an attribute that is not "Read-Only" by entering the new value in form 724, as shown, and returning a message to the HTTP server process 300, FIG. 3, by invoking the eval and save control 726. The user may invoke control 726 by "clicking" on control 726 using, for example, mouse 226, FIG. 2. Restore value control 728 allows the user clear user entered values from form 724, and restore values sent down with the form, if any.

An edit request may be an HTTP request 312 in which the value of "$dir_1$" has the value "Edit" or other third predetermined value in forming page server process 500 that the EDIT service is to be performed. As previously described, field "$dir_2$" contains an object identifier, in this instance, the identifier of the object whose attribute is to be modified. The value in the "$dir_3$" field of the url-path of HTTP request 312 may identify the attribute field to be modified. In the exemplary attribute of FIG. 7.2, the field which may be modified is the attribute value field 712, as previously described. Additionally, the new value of the attribute may be included in a query portion of the HTTP request. Thus an exemplary URL may be http://server:port/Explorer/edit/objectID/FieldName with query string fieldName=value0 & fieldName=value1. In response, the server sets the value of the elements of variable "fieldName" (in this example a two element array) to value0 and value1. Query strings formatted in this way specify named value pairs. However, alternative embodiments may be implemented in which the requested function and object ID are embedded in the query string, and additionally, may be formatted as an XML query. It would be recognized that such alternative embodiments would be within the spirit and scope of the present invention. Page server methodology 500 then sends a new edit attribute page 512 with the updated value to the client via another step 508.

Because a tool object model that may be used with the present invention may be highly configurable, page server methodology 500 accommodates a variety of models configured for various tools and service combinations. In responding to an information request, as discussed above in conjunction with step 504, the response sent in step 508 passes to the client a few root objects. Other tool objects in the tool object model are accessed by exploring parent-child relationships from the root objects or the descendants thereof. Child information may be provided by page server methodology 500 in response to an HTTP request 312 having a fourth predetermined value for "$dir_1$". In an embodiment of the present invention, the fourth predetermined value of "$dir_1$" may be the string "Extend" however other predetermined values may be used, as an artisan of ordinary skill would understand. If HTTP request 312 includes the fourth predetermined value for "$dir_1$", inspection step 502 passes the request to expand step 514 which generates and EXTEND model response 516. EXTEND model response 516 contains only the child object names and the relation to the parent object, identified by the object identifier in field "$dir_2$" in the corresponding HTTP request 312. Additional details about a child object may be obtained by invoking information step 504 through an INFO request as described hereinabove.

Thus, for example, consider FIG. 8.1 illustrating a graphical display operable for initiating an EXTEND request. Display 802 illustrates a plurality of attributes associated with Generic tool tool 706 described hereinabove in conjunction with FIGS. 7.1 and 7.2. Highlighted in display 802 is SECSStandard data definition object 804. (SECSStandard data definition objects refer to the SEMI Equipment Communications Standard (SECS) promulgated by the SEMI. SECS is described further hereinbelow in conjunction with FIGS. 9.1 and 9.2.) If a user were interested in the subdefinitions of the SECS Standard data definition object 804, an embodiment of the present invention, "clicking" on triangle 806 would initiate an HTTP request, such as HTTP request 312, FIG. 3, including the third predetermined value in field "$dir_1$". Because triangle 806 is associated with SECSStandard data definition object 804, the value in field "$dir_2$" in the HTTP request may be the string "SECSStandard". Although the exemplary display 802 and 808, FIG. 8.2, below, are shown with respect to a SECS implementation of tool automation, an artisan would understand that the principles of the present invention illustrated thereby may be used in alternative embodiments employing other automation protocol. It would also be understood that such alternative embodiments would be within the spirit and scope of the present invention.

In response, inspect function step 502 passes the corresponding HTTP request 312 to step 514 and EXTEND model page 516 generates display 808 illustrating in FIG. 8.2 on the users display. Beneath SECStandard data definition object 804 appears a plurality of subdefinitions 810.

Additionally, execution of tool object methods may be initiated via page server methodology 500. Refer now to FIG. 9.1 illustrating a portion of an INFO display 902. A directory of methods 904 includes start method 906 (shown highlighted) in FIG. 9.1. In an embodiment of the present invention, start method 906 may be a method of the SECS Initiate Processing Service 908. INFO display 902 may be used to initiate an INFO HTTP request as previously described hereinabove in conjunction with FIG. 6.1. In response, page server methodology 500 passes the request to INFO step 504 which generates an INFO page 506 which produces display 910 in FIG. 9.2. Display 910 includes information about a method, for example, description field 912 and service name field 914, which, in the exemplary display 910, indicates the SECS initiate processing service 908.

An artisan of ordinary skill would recognize that the principles of the present invention do not rely on the particular detailed information shown in exemplary INFO display 910, and it would be further recognized that alternative tool object models may include additional information in the corresponding display, or omit some of the detailed information included in exemplary display 910.

Additionally, display 910 includes execute method control 916. In the embodiment of FIGS. 9.1 and 9.2, execute method control 916 may be used to initiate processing on a tool. For example, a user by "clicking" on execute method control 916 may initiate an HTTP request which is received by page server methodology 500. An EXECUTE HTTP request generated in response to user input via execute method control 916, may include a fourth predetermined value in field "$dir_1$". In an embodiment of the present invention, the fourth predetermined value may be the string "Execute"; however, it would be understood by an artisan of ordinary skill that other predetermined values may be used, and such alternative embodiments would be within the spirit and the scope of the present invention.

In response to the fourth predetermined value in the "$dir_1$" field in the HTTP request, inspection step 502 passes the request to execute step 518. In step 518, page server process 500 invokes the method 520 corresponding to the objectID received in the EXECUTE request whereby a message is sent to the tool corresponding to the tool object in the HTTP request, such as HTTP request 312. The method implementation itself may be supplied by the tool manufacturer or other third party supplier. The tool object may be specified by an object identifier (ID) value in "$dir_2$" field in the URL-path portion of the HTTP request. In an embodiment of the present invention, page server methodology 500 may identify the tool corresponding to the objectID via a table maintained on the data processing system executing page server methodology 500.

Method execution may be further understood by referring to FIG. 5.2 illustrating remote processing control method 521, which may be one of the plurality of methods 520 in FIG. 5. In step 523, an initiate processing request is sent to the tool. In step 525, methodology 521 waits for an initiate processing acknowledge from the tool. On receipt of the reply, methodology 521, in step 527, awaits for an event report from the tool. The creation of an event report, and the display thereof is discussed hereinbelow in conjunction with FIGS. 10.1 and 10.2. In step 529, following receipt of the event report, sends a message to the tool acknowledging the receipt of the event report. If, in step 531, processing is complete, methodology 521 exits. Otherwise, the method loops over steps 527 and 529, until processing completes.

Messages may be sent to the tool using a standard communications protocol, for example, the Transmission Control Protocol/Internet Protocol (TCP/IP) via a local area network, such as LAN 124, FIG. 1. The message format in such an embodiment may be specified by the High-Speed SECS Message Services (HSMS) specification. The HSMS is promulgated by Semiconductor Equipment and Materials International (SEMI). In such an embodiment, the format of the message sent by the method, for example method 521, FIG. 5.2 may be in accordance with SECS encoding in which the message is specified in a two-byte integer format. The first byte denotes a category, or "stream", and the second byte defines the function to be performed by the tool.

For example, the initiate processing request, sent in step 523, FIG. 5.2, may be denoted "S2F27", where the "S" indicates that the first value corresponds to the stream, and the second value corresponds to the function.

In an alternative embodiment, the server implementing page server process 500, such as server 101 in FIG. 1, may communicate with the tool using a point-to-point message transfer protocol, such as SECS-I. SECS-I is also promulgated by SEMI. In such an embodiment, server 101 may be connected to each of tools 111 via an RS-232 serial port. (An artisan of ordinary skill would understand that an RS-232 compatible serial port implements signal levels in accordance with the RS-232 standard promulgated by the Electronics Industries Association (EIA).) It would be recognized by an artisan of ordinary skill that the principles of the present invention do not rely on the particular communications protocol used to send messages to the tool, and, a protocol in accordance with the HSMS specification or, alternatively, SEC-I would be within the spirit and scope of the present invention.

Although the EXECUTE function has been described in the context of initiating processing, particular tool management protocol, such as the GEM standard, may provide a plurality of control and monitoring methods. An artisan of ordinary skill would recognize that these may also be invoked using an execute request with the corresponding object ID in the "dir$_2$" field of the URL.

Additionally, a method, such as one or more of methods 520, FIG. 5, receives messages from the tools, such as tools 111 in FIG. 1. For example, a "Create Report" method which may be invoked by sending the corresponding HTTP request, may define a "report" (a selected set of variables whose values are to be reported), link the report to a particular event on the tool and enable that event whereby a message is sent by the tool on the occurrence of the specified event. As described hereinabove, such messages may be received by remote processing method 521, and cached by the server performing the method, such as server 110, FIG. 1. Now, recall that in the exemplary display 808 discussed in conjunction with FIG. 8.2, a plurality of child objects 810 is shown. The plurality of child objects 810 includes an event reporting object 812. Referring now to FIG. 10.1, there is illustrated therein a message history display portion 1020. Display portion 1020 is a child object of event reporting object 812, FIG. 8.2 and may be displayed by executing the expand function, step 514 in page server methodology 500, FIG. 5 as previously described. Display portion 1020 shows a plurality of message histories 1022. In the exemplary embodiment of FIG. 10.1 in which messages are sent in accordance with the SECS-II format, the messages are indicated using the "SmFn" nomenclature. Message history 1024 corresponds to the initiate processing request discussed in conjunction with FIGS. 9.1 and 9.2. Associated with message history 1024 are a plurality of child objects 1026. These may be displayed as illustrated in FIG. 10.1 by executing the EXPAND step 514 of page server methodology 500 by initiating a corresponding HTTP request, as described hereinabove in conjunction with FIGS. 8.1 and 8.2. Note that the "PID" daughter object 1028 and the "MID" daughter object 1030 correspond to values in the respective fields shown in message information display 910, fields 916 and 918 respectively.

Furthermore, detailed information about messages (messages are objects) may be obtained by initiating an information HTTP request, as discussed hereinabove in conjunction with FIGS. 6.1, 6.2, as well as 9.1 and 9.2. The corresponding HTTP request includes the second predetermined value, for example, "Info" in the "dir$_1$" field of the url-path portion of the HTTP request, and the object identifier of the selected message, for example, one of the corresponding message history, for example one of message history 1022, FIG. 10.1, in the "dir$_2$" field of the request. In response, page server methodology 500 passes the request to step 504, FIG. 5, and a corresponding information page 506 is sent in step 508. FIG. 10.2 illustrates information display 1028 corresponding to message history 1024 in an embodiment of the present invention in which messages conform to the SECS-II specification. However, it would be understood by an artisan of ordinary skill in the art that the principles of the present invention embodied in page server methodology 500 for displaying message information do not rely on the SECS definitions, and other predetermined, message formats may be used in similar fashion. It also would be understood by persons of ordinary skill in the art that embodiments of the present invention using other such predetermined message formats would be within the spirit and scope of the present invention.

Figure 11:
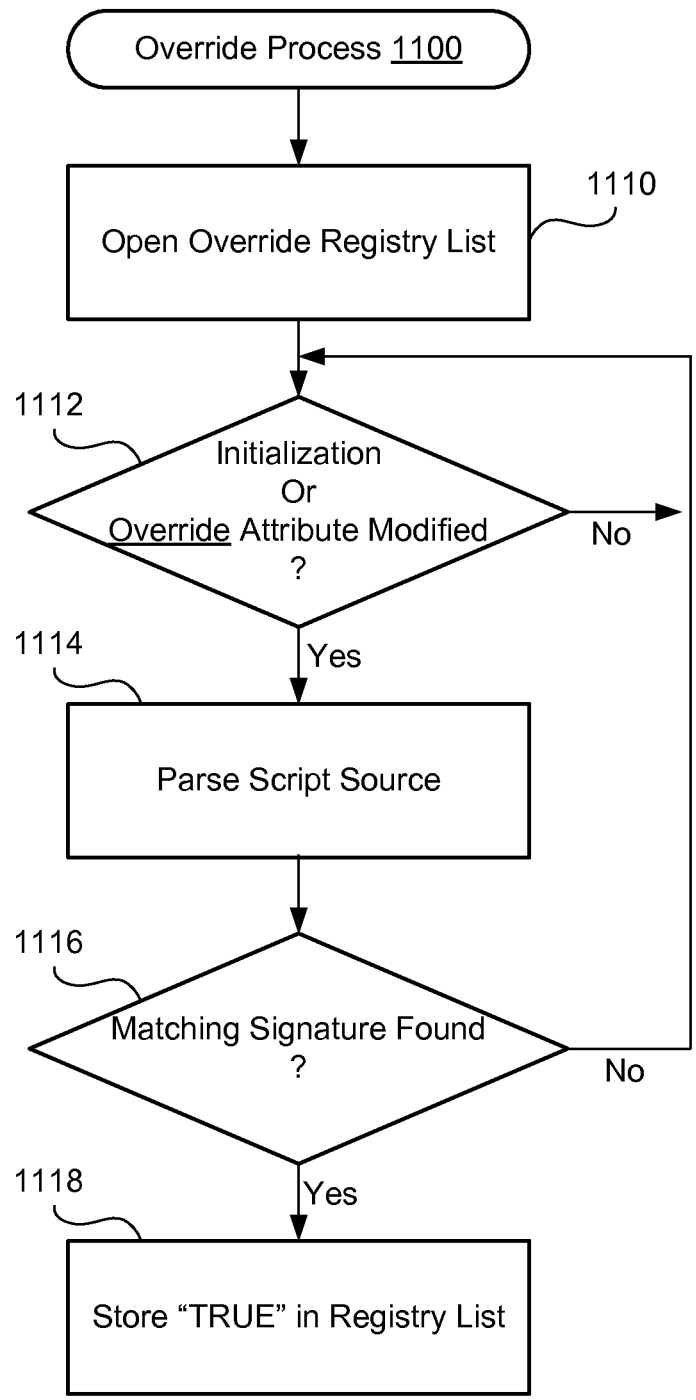
FIG. 11 illustrates, in flow chart form, a service method override process in accordance with an embodiment of the present invention.

The present invention also allows for user customization of methods associated with the tool objects. Returning to FIG. 5, the method invoked by execute step 518, in response to a corresponding HTTP request, may be a default method provided, for example, by the particular tool objection implementation used. Alternatively, the present invention provides a mechanism by which the default mechanism typically compiled code, may be overridden. In FIG. 11, a flowchart of override process 1100 is shown. Override process 1100 is performed for each object in the tool object model. Each object in the tool object model includes a script override attribute. This attribute contains script source code. (If the default method is to be used for a particular object, the length of the script source may be zero.) In step 1110, for the corresponding object, an override registry list is opened. In an embodiment of the present invention, the list may contain a Boolean variable for each method associated with the object in which the Boolean value may be initialized to "FALSE", indicating that the method has not been overridden.

If override process 1100 is being performed on an initialization, or if an override attribute of an object has been modified by the user, step 1112, the script source is parsed in step 1114. In an embodiment of the present invention, the scripting language may be VBScript (Visual Basic Scripting Edition, a scripting language developed by Microsoft Corporation). However, other scripting languages could be used, and would be within the spirit and scope of the present invention. In step 1116, it is determined if the script contains a method having a matching signature as a default method associated with the object. In an object oriented program paradigm, such as that used in the present invention, each method has a name, a return type (which specifies a type of a value returned by the method), and, optimally, a set of arguments. Taken together, these form the "signature" of the method. If, in step 1116, a matching signature is found, then the Boolean value "TRUE" is stored in the object override registry list opened in step 1110 in an entry corresponding to the overridden method. If, however, in step 1116, no matching signature is found, then the initial Boolean value of "FALSE" remains in the registry list entry, and signals that the default method has not been overridden. Override process 1110 then returns to step 1112 to determine if the override attribute is subsequently modified. Process 1100 loops until the override attribute is modified, or a reinitialization has occurred.

In this way, a user can customize methods that act on the tool objects without recompiling code. Additionally, the script source code does not need to be parsed each time a method is invoked. Returning to FIG. 5, when execute step 318 invokes a method, it refers to the override registry list to determine if the method has been overridden. If not, it invokes the, typically compiled, default method. Otherwise, it executes the override script.

Although the present invention and its advantages have been described in detail, it should be understood that various changes, substitutions and alterations can be made herein without departing from the spirit and scope of the invention as defined by the appended claims.

What is claimed is:

1. A method implemented on at least one server computer, comprising:
    establishing a session over the Internet with a client device, the client device being one of a plurality of client devices networked via a first local area network (LAN) that is connected to the Internet, the session configured to provide for remote control or monitoring of a manufacturing tool over the Internet via communication with a controller of the manufacturing tool, the manufacturing tool configured for a process operation for semiconductor fabrication, the manufacturing tool being one of a plurality of manufacturing tools for semiconductor fabrication in a semiconductor fabrication facility (FAB), the manufacturing tools being networked via a second LAN that is connected to the Internet, each of the manufacturing tools having a pre-defined identifier;
    receiving a request from the client device, via the first LAN, to access an equipment model corresponding to the manufacturing tool, the equipment model defining a representation of the manufacturing tool that is remotely accessible to enable the remote control or monitoring of the manufacturing tool over the Internet, the equipment model defining a directory of one or more service objects that define services for the manufacturing tool that are capable of being accessed by the client device;
    responsive to the request to access the equipment model, sending a message to the controller of the manufacturing tool using a standards-based communication protocol, wherein the request to access the equipment model invokes a method defined by a service object whereby the message is sent to the controller of the manufacturing tool;
    receiving data from the controller of the manufacturing tool in response to the message, via the second LAN, that is stored for the service object of the manufacturing tool, the service object identifying the process operation and attributes of actions performed by the manufacturing tool;
    sending to the client device, via the session, a response to the request, the response including the data received from the manufacturing tool that is stored for the service object.

2. The method of claim 1, wherein establishing the session includes authenticating a user of the client device to determine whether the user is authorized to access the services for the manufacturing tool.

3. The method of claim 2, wherein the server computer manages access to the plurality of manufacturing tools by a plurality of users to allow each of the plurality of users to communicate with one or more of the plurality of manufacturing tools.

4. The method of claim 1, wherein the request identifies a service object that provides for remote electronic diagnostics of the manufacturing tool.

5. The method of claim 4, wherein performance of the remote electronic diagnostics is defined by invocation of the service object that provides the remote electronic diagnostics to procure one or more values associated with particular information requested about the manufacturing tool.

6. The method of claim 1, wherein the representation of the manufacturing tool defines a hierarchical structure of a plurality of objects.

7. The method of claim 6, wherein the hierarchical structure is defined by an arrangement of the plurality of objects in parent-child relationships, including a root object and descendants thereof.

8. The method of claim 1, wherein the data that is stored for the service object defines methods of the service that is identified by the service object.

9. The method of claim 8, wherein sending the response to the request to the client device enables remote access to event data including a set of collection event items and a set of report variables regarding the process operation by the manufacturing tool.

10. The method of claim 8, wherein the attributes are defined by one or more variables of a process chamber of the manufacturing tool, the variables being selected from temperature, pressure, or status.

11. The method of claim 1, wherein communications between one or more of the client device, the server computer, and the manufacturing tool, are defined using one or more of Hypertext Transfer Protocol (HTTP), Hypertext Markup Language (HTML), and Extensible Markup Language (XML).

12. The method of claim 1, further comprising:
    generating a security wrapper layer for the manufacturing tool, wherein the security wrapper layer controls access to the services of the manufacturing tool by the plurality of client devices.

13. The method of claim 1, wherein the services define access to one or more of attributes of the manufacturing tool, methods for operating the manufacturing tool, and events reported from the manufacturing tool.

14. The method of claim 1, wherein the client device is configured to receive the data sent from the server computer and apply the received data to a user interface depicting the equipment model, wherein the data is applied to display attributes or values of objects of the equipment model for the manufacturing tool and specific ones of the client devices having access to the services identified by the equipment model.

15. The method of claim 14, wherein the user interface provides access to historical information for one or more of the manufacturing tools.

16. The method of claim 1, wherein the client device is configured to receive the data sent from the server computer and apply the received data to a user interface depicting the equipment model, wherein the data is applied to display attributes or values of objects of the equipment model for the manufacturing tool and specific ones of the client devices having access to the services identified by the equipment model.

17. The method of claim 1, wherein the request is received through the session over the Internet.

18. The method of claim 17, wherein the session enables remote modification to effect a change to a configuration of the controller of the manufacturing tool for the process operation for semiconductor fabrication.

19. A method implemented on at least one server computer, comprising:
- establishing a session over the Internet with a client device, the client device being one of a plurality of client devices networked via a first local area network (LAN) that is connected to the Internet, the session configured to provide for remote control or monitoring of a manufacturing tool over the Internet via communication with a controller of the manufacturing tool, the manufacturing tool configured for a process operation for semiconductor fabrication, the manufacturing tool being one of a plurality of manufacturing tools for semiconductor fabrication in a semiconductor fabrication facility (FAB), the manufacturing tools being networked via a second LAN that is connected to the Internet;
- receiving a request from the client device, via the first LAN, to access an equipment model corresponding to the manufacturing tool, the equipment model defining a representation of the manufacturing tool that is remotely accessible to enable the remote control or monitoring of the manufacturing tool over the Internet, the equipment model defining a directory of one or more service objects that define services for the manufacturing tool that are capable of being accessed by the client device;
- responsive to the request to access the equipment model, sending a message to the controller of the manufacturing tool using a standards-based communication protocol, wherein the request to access the equipment model invokes a method defined by a service object whereby the message is sent to the controller of the manufacturing tool;
- receiving data from the controller of the manufacturing tool in response to the message, via the second LAN, that is stored for the service object of the manufacturing tool, the service object identifying the process operation and attributes of actions performed by the manufacturing tool;
- sending to the client device, via the session, a response to the request, the response including the data received from the manufacturing tool that is stored for the service object;
- generating a security wrapper layer for the manufacturing tool, wherein the security wrapper layer controls access to the services of the manufacturing tool by the plurality of client devices;
- wherein the client device is configured to receive the data sent from the server computer and apply the received data to a user interface depicting the equipment model, wherein the data is applied to display attributes or values of objects of the equipment model for the manufacturing tool and specific ones of the client devices having access to the services identified by the equipment model.

20. A system comprising at least one server computer, wherein said at least one server computer is configured to perform the following operations:
- establishing a session over the Internet with a client device, the client device being one of a plurality of client devices networked via a first local area network (LAN) that is connected to the Internet, the session configured to provide for remote control or monitoring of a manufacturing tool over the Internet via communication with a controller of the manufacturing tool, the manufacturing tool configured for a process operation for semiconductor fabrication, the manufacturing tool being one of a plurality of manufacturing tools for semiconductor fabrication in a semiconductor fabrication facility (FAB), the manufacturing tools being networked via a second LAN that is connected to the Internet, each of the manufacturing tools having a pre-defined identifier;
- receiving a request from the client device, via the first LAN, to access an equipment model corresponding to the manufacturing tool, the equipment model defining a representation of the manufacturing tool that is remotely accessible to enable the remote control or monitoring of the manufacturing tool over the Internet, the equipment model defining a directory of one or more service objects that define services for the manufacturing tool that are capable of being accessed by the client device;
- responsive to the request to access the equipment model, sending a message to the controller of the manufacturing tool using a standards-based communication protocol, wherein the request to access the equipment model invokes a method defined by a service object whereby the message is sent to the controller of the manufacturing tool;
- receiving data from the controller of the manufacturing tool in response to the message, via the second LAN, that is stored for the service object of the manufacturing tool, the service object identifying the process operation and attributes of actions performed by the manufacturing tool;
- sending to the client device, via the session, a response to the request, the response including the data received from the manufacturing tool that is stored for the service object.

21. The system of claim 20,
- wherein establishing the session includes authenticating a user of the client device to determine whether the user is authorized to access the services for the manufacturing tool;
- wherein the server computer manages access to the plurality of manufacturing tools by a plurality of users to allow each of the plurality of users to communicate with one or more of the plurality of manufacturing tools.

22. The system of claim 20,
- wherein the request identifies a service object that provides for remote electronic diagnostics of the manufacturing tool;
- wherein performance of the remote electronic diagnostics is defined by invocation of the service object that provides the remote electronic diagnostics to procure one or more values associated with particular information requested about the manufacturing tool.

23. The system of claim 20, wherein the representation of the manufacturing tool defines a hierarchical structure of a plurality of objects, wherein the hierarchical structure is defined by an arrangement of the plurality of objects in parent-child relationships, including a root object and descendants thereof.

24. The system of claim 20, wherein communications between one or more of the client device, the server computer, and the manufacturing tool, are defined using one or more of Hypertext Transfer Protocol (HTTP), Hypertext Markup Language (HTML), and Extensible Markup Language (XML).

25. The system of claim 20, wherein said at least one server computer is further configured to perform the following operation:

generating a security wrapper layer for the manufacturing tool, wherein the security wrapper layer controls access to the services of the manufacturing tool by the plurality of client devices;

wherein the services define access to one or more of attributes of the manufacturing tool, methods for operating the manufacturing tool, and events reported from the manufacturing tool.

* * * * *